(12) United States Patent
Sonnenrein

(10) Patent No.: US 8,641,018 B2
(45) Date of Patent: Feb. 4, 2014

(54) DEVICE AND METHOD FOR THE INTERMITTENT IMPREGNATION AND OUTPUT OF DRINKING WATER

(75) Inventor: Gerrit Sonnenrein, Paderborn (DE)

(73) Assignee: Suto GmbH & BioLogic GmbH, Lübbecke & Delbrück (DE)

( * ) Notice: Subject to any disclaimer, the term of this patent is extended or adjusted under 35 U.S.C. 154(b) by 552 days.

(21) Appl. No.: 12/674,608

(22) PCT Filed: Aug. 21, 2008

(86) PCT No.: PCT/DE2008/001368
§ 371 (c)(1),
(2), (4) Date: Apr. 5, 2011

(87) PCT Pub. No.: WO2009/024139
PCT Pub. Date: Feb. 26, 2009

(65) Prior Publication Data
US 2011/0177201 A1     Jul. 21, 2011

(30) Foreign Application Priority Data
Aug. 21, 2007    (DE) .................. 10 2007 039 472

(51) Int. Cl.
*B01F 3/04*        (2006.01)
(52) U.S. Cl.
USPC .............................................. 261/76; 99/275
(58) Field of Classification Search
USPC ............... 261/76, 77, 119.1; 99/275
See application file for complete search history.

(56) References Cited

U.S. PATENT DOCUMENTS

| | | | | |
|---|---|---|---|---|
| 3,618,905 A | * | 11/1971 | Primus | 261/153 |
| 4,766,001 A | * | 8/1988 | Mizandjian et al. | 426/477 |
| 5,021,250 A | * | 6/1991 | Ferguson | 426/231 |
| 5,417,146 A | * | 5/1995 | Zimmer et al. | 99/323.1 |
| 5,510,060 A | * | 4/1996 | Knoll | 261/27 |
| 5,842,600 A | * | 12/1998 | Singleterry et al. | 222/1 |
| 6,060,092 A | * | 5/2000 | Oesterwind et al. | 426/67 |

FOREIGN PATENT DOCUMENTS

| | | |
|---|---|---|
| DE | 3038045 | 4/1982 |
| DE | 197 15 958 A1 | 10/1998 |
| DE | 198 17 890 A1 | 10/1999 |
| WO | WO/02/38488 | 5/2002 |
| WO | WO 02/079073 A | 10/2002 |
| WO | WO 2004/024306 | 3/2004 |
| WO | WO 2007/141339 A | 12/2007 |
| WO | WO 2008/116530 A | 10/2008 |
| WO | WO 2006/034829 | 4/2010 |

* cited by examiner

*Primary Examiner* — Robert A Hopkins
(74) *Attorney, Agent, or Firm* — Ursula B. Day; Law Firm Ursula B. Day

(57) ABSTRACT

The invention relates to a method and an associated device for intermittently enriching and dispersing drinking water with gases, particularly $CO_2$ and/or $O_2$, wherein the water is supplied to a mixing device (5) by means of a miniature pump (3), particularly an electromagnetic oscillating piston pump with a low supply volume and the greater throughput volume required for the tap process is realized by the gas flowing into the mixing device (5).

12 Claims, 1 Drawing Sheet

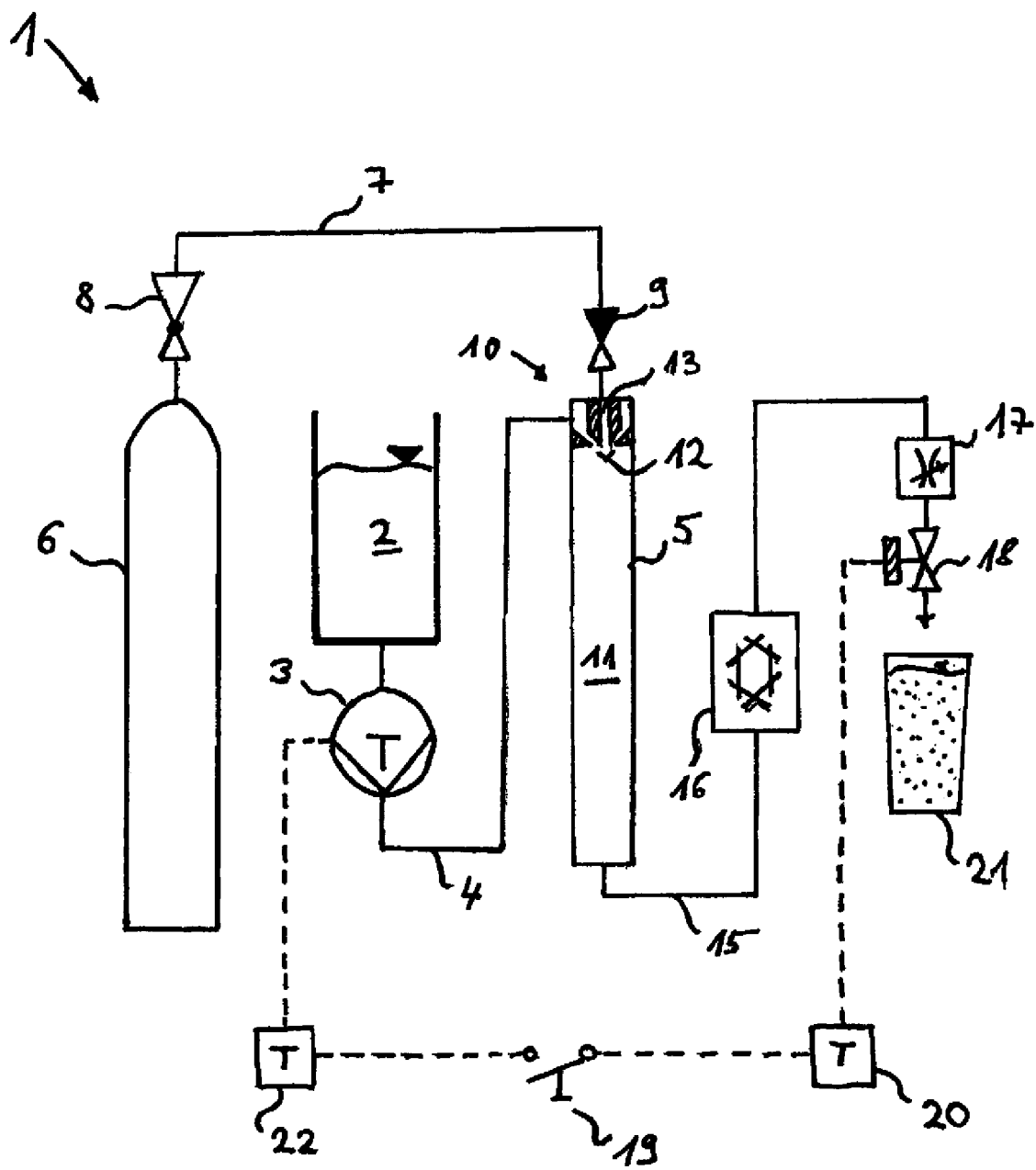

DEVICE AND METHOD FOR THE INTERMITTENT IMPREGNATION AND OUTPUT OF DRINKING WATER

CROSS-REFERENCES TO RELATED APPLICATIONS

This application is the U.S. National Stage of International Application No. PCT/DE2008/001368, filed Aug. 21, 2008, which designated the United States and has been published as International Publication No. WO 2009/024139 and which claims the priority of German Patent Application, Serial No. 10 2007 039 472.3, filed Aug. 21, 2007, pursuant to 35 U.S.C. 119(a)-(d).

BACKGROUND OF THE INVENTION

The invention refers to a method and a device for the intermittent enrichment and output of drinking water with gases, in particular $CO_2$ and/or $O_2$ relating to the intermittent enrichment and output of drinking water with gas, in particular $CO_2$ and/or $O_2$ via a mixing device, which supplies gas to drinking water and a mixing device with a connection for liquid supply and a connection for gas supply and a connection for a tapping line for drawing the enriched drinking water.

Methods and devices for the enrichment of drinking water with carbon dioxide ($CO_2$), also known as carbonation, have been part of the prior art for a long time. The principle according to which the carbonators function can be basically divided into two types.

In professional and semi-professional dispensing systems the enrichment is carried out in a pressure vessel, where the level is determined by a corresponding sensor system and is held to approximate a constant level by means of a high pressure pump (e.g. DE 30 38 045). In some cases the water which has been enriched in this manner circulates by means of a further pump additionally via a cooling system. A drawback in this type of carbonation to secure a sufficient water level in the container is however that pump units are required which have a large output. Such high energy pump units, aside from the costly measuring, control and automatic control mechanism, are quite expensive and thus not suitable for private households.

Due to this, lately, so-called "inline carbonators" were developed so private households can enrich drinking water with carbon dioxide through a continuous operation (see WO 2004/024306, PCT/DE01/04128). However, should the water pressure in the water pressure in the respective household be too low or the carbonation is to be carried out without a regular tie-in to the water pipe, then a pressure enhancement pump is likewise required. Since a flowing pressure of about 3 to 4 bar at a flow-through rate of 1 to 2 liter per minute suffices, the technical requirements with this type of carbonation is markedly lower as compared to the classical methods, but still always require additional noticeable additional costs.

SUMMARY OF THE INVENTION

Starting from the prior art as afore-described, an object of the present invention is to provide a method, and a corresponding device for the intermittent enrichment of drinking water with gas, especially enrichment with $CO_2$ and/or $O_2$, which solves the afore-described drawbacks of the prior art and with which an especially cost efficient or, if possible, an apportioned enrichment and output of smaller water portions can be realized that is thus suitable for private households.

This object is solved by means of a method which includes supplying the drinking water to the mixing device by means of a miniature pump, in particular an electromagnetic piston pump with a low supply volume and realizing higher flow through gas by streaming it into the mixing device; and a device, which includes that the miniature pump, which in particular is an electromagnetic piston pump having a low supply volume is at the liquid supply line, and a nonreturn valve at the gas supply as well as a magnetic valve in the tapping line of the mixing device.

According to an important aspect of the invention, the flow through amount required for drawing-off water from the tap for quickly filling a drinking cup, is realized by means of the continuous gas pressure adjacent to the mixing device which leads to a corresponding lowering of the water level in the mixing chamber, whereby restoring the water level after the draw-off is again secured through a follow-on running of the miniature pump and controlled by means of a simple time switch, to thus advantageously avoid a labor- and cost intensive level sensor mechanism and level control mechanism according to the prior art to date.

The flow through amount is determined by the adjacent gas pressure and the draw-off geometry and the draw-off amount per draw-off can be also provided by means of a simple time switch, via a magnetic valve.

In a preferred embodiment, the output is coordinated by a flow through volume control which keeps the amount of flow through volume constant and independent from the adjacent pressure, in the same manner as in the water saving devices in sanitary appliances, but also already integrated into magnetic valves that are on the market today. Hereby, cost can be further reduced, since the precision of the pressure reducer provided downstream of the gas storage now no longer determines each of the tapped portions. Moreover, it is also possible to determine the saturation degree of the water through varying the gas pressure.

In a preferred embodiment, the mixing device is provided with a nozzle body for producing possibly a large phase contact surface and a connecting mixing chamber. It was found that a nozzle ring gap and a gas nozzle disposed centrally to the nozzle ring gap were especially suitable, since with this embodiment a good atomization can be realized and additionally a fall film is formed at the walls of the mixing chamber.

A further preferred embodiment of the present invention provides that a cooling unit is assigned to the mixing device, preferably between mixing device and output and by utilizing a thermoelectric cooling, such as for example recited in WO 2006/034829, to thus reduce production cost.

It is furthermore advantageous to provide a filter element at the water storage tank or the water pipe.

Further details and advantages of the invention are explained in the following description of an embodiment from the single FIGURE as herein shown in a simplified block diagram of the device according to the invention.

DETAILED DESCRIPTION OF PREFERRED EMBODIMENTS

The exemplary device 1 illustrated in the FIGURE as a schematic block diagram is provided especially for the carbonation and, if applicable, apportioned output of drinking water for the end consumer.

This device comprises a water storage tank 2 from which the water is supplied via a water pipe 4 to a mixing device 5 by means of a miniature pump 3, preferably a magnetic piston pump or a comparable miniature pump.

The device 1 shows additionally a gas storage 6, from which a gas pipe 7 extends to the mixing device 5 via a pressure reducer 8 and nonreturn valve 9.

The mixing device 5 consists of a nozzle body 10 and a mixing chamber 11, wherein the nozzle body 10, for example, is configured as described in the WO 2004/024306. It comprises the nozzle ring gap 12, which is connected with the water supply pipe 4 and a central gas injection nozzle 13, which is connected via the nonreturn valve 9 with gas supply pipe 7.

The enriched water leaves the mixing chamber 11 by way of an outlet which runs directly into the tapping line 15. The tapping line 15 has been assigned a flow rate control 17 and a magnetic valve 18, and the drinking water, if possible, runs through a prior cooling device 16.

The control of device 1 is carried out by means of a switch or key button 19, which is connected with magnetic valve 18 and the miniature pump 3, preferably each via a timer, or timer switch 20, 22. If the switch or key button 19 is activated by the consumer, the magnetic valve 18 in the tapping line 15 opens and the piston pump 3 starts pumping. The streaming gas coming through the gas pipe presses the enriched water from the mixing chamber 11 and the water level in the mixing chamber 11 markedly decreases due to the very small transporting capacity of the miniature piston pump 3, that is, the pressure in the mixing chamber 11 decreases to the value that has been preset at the pressure reducer 8. The volume of the mixing chamber 11 thus corresponds at least to the desired tapping amount per tapping event.

This tapping amount can be determined in easy manner by means of the timer 20 while the flow through volume is held constant by means of the flow through volume controller 17. If, for example with each activation of the key button 19, the cup 21 is to be filled with 200 ml when utilizing a flow through volume controller having a flow through volume of 2 liter per minute, the timer 20 for the magnetic valve 18 is then set for about 6 seconds. In this case, the volume of the mixing chamber 11 should also be dimensioned with at least 200 ml, whereby in that case, the mixing device 5 is filled entirely with carbon dioxide after the automatic tapping process has ended.

The gas pressure at the gas reducer 8 is preferably adjusted or adjustable such that the gas which now fills the mixing device 11 can be completely dissolved through the after running of the miniature pump 3 and results in a "dissolved-concentration" between 4 and 6 gram per liter.

During the after running period, the pressure in the mixing chamber 11 increases again to the maximal delivery pressure of pump 3, whereby the fast dissolution of the gas is supported. The required after running of the miniature pump 3 for the refilling of the mixing chamber 11 can be realized by means of a timer switch 22. After completion of the refilling process the device is again ready for tapping.

The invention has been afore-described by means of an exemplary embodiment. It is understood that numerous modifications and variations are possible without departing from the principle at the basis of the invention.

REFERENCE NUMERALS 1 device
2 water storage tank
3 miniature pump
4 water pipe
5 mixing device
6 gas storage
7 gas line
8 pressure reducer
9 nonreturn valve
10 nozzle body
11 mixing chamber
12 nozzle ring gap
13 gas injection nozzle
15 tapping line
16 cooling device
17 Flow through volume control
18 magnetic valve
19 Key button
20 timer
21 cup
22 timer switch

What is claimed is:

1. A device for the continuous enrichment and intermittent output of drinking water with gases, in particular $CO_2$ and/or $O_2$, comprising;
   a mixing unit having connections respectively to a supply line of liquid, a supply line of gas and a tapping line for drawing the enriched drinking water, and
   an electromagnetic miniature pump disposed at the liquid supply line to supply liquid to the mixing unit,
   a non-return valve disposed at the gas supply line, and
   a magnetic valve disposed in the tapping line; wherein when enriched water is drawn from the tapping line, the magnetic valve is opened and the pump pumps water to restore the water level in the mixing unit where the water is continually enriched with gas residing in the mixing device, wherein the supply of gas is under pressure to a preset value and wherein the mixing unit has a volume that is equal or greater to the tapping volume.

2. The device of claim 1, wherein the miniature pump is an electromagnetic piston pump.

3. The device of claim 1, wherein the supply volume of the miniature pump is less than the flow through volume during the tapping process.

4. The device of claim 1, wherein the tapping line is provided with a flow through volume control for keeping the flow through volume constant.

5. The device of claim 1, wherein the magnet valve and the miniature pump are controlled via timer switches.

6. The device of claim 1, wherein in the gas supply line, a pressure reducer is superposed at the nonreturn valve, and adjustable to a change of a saturation degree.

7. The device of claim 1, wherein the mixing device is provided with a nozzle body for enlarging a phase contact surface, and an adjacent mixing chamber.

8. The device of claim 1, wherein the nozzle body has a nozzle ring gap and a gas injection nozzle disposed centrally to the nozzle ring gap.

9. The device of claim 1, further comprising a water supply manually fillable and/or via the water line from which the water is supplied to the mixing device by means of the miniature pump via the liquid supply.

10. The device of claim 9, wherein a filter element is provided for a water storage or the water supply formed by the water supply line.

11. The device of claim 1, wherein the mixing device is provided with a cooling unit.

12. The device of claim 1, wherein the cooling unit is disposed in the tapping line.

* * * * *